US007445366B2

(12) United States Patent
Tsukamoto et al.

(10) Patent No.: US 7,445,366 B2
(45) **Date of Patent: *Nov. 4, 2008**

(54) VEHICLE LAMP WITH AUXILIARY LENS

(75) Inventors: Michio Tsukamoto, Shizuoka (JP); Hiroshi Kawashima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/488,596

(22) Filed: Jul. 19, 2006

(65) Prior Publication Data

US 2007/0019428 A1 Jan. 25, 2007

(30) Foreign Application Priority Data

Jul. 19, 2005 (JP) .......................... P.2005-209049

(51) Int. Cl.
*B60Q 1/00* (2006.01)

(52) U.S. Cl. ........................ 362/538; 362/521; 362/520; 362/331; 362/332; 362/308

(58) Field of Classification Search ................. 362/538, 362/507, 335, 475, 334, 546, 328, 539, 460, 362/520-522, 331-332, 509, 487, 299, 300, 362/307-311, 329; 359/649; 353/13
See application file for complete search history.

(56) References Cited

U.S. PATENT DOCUMENTS

| | | | | |
|---|---|---|---|---|
| 5,307,247 | A * | 4/1994 | Cejnek | 362/539 |
| 5,353,204 | A * | 10/1994 | Kawamura | 362/538 |
| 5,567,034 | A * | 10/1996 | Dietewich et al. | 362/512 |
| 6,132,074 | A * | 10/2000 | Bristle et al. | 362/538 |
| 6,161,952 | A * | 12/2000 | Schuster et al. | 362/539 |
| 6,220,736 | B1 * | 4/2001 | Dobler et al. | 362/539 |
| 6,244,732 | B1 * | 6/2001 | Futami et al. | 362/328 |
| 6,406,171 | B1 * | 6/2002 | Satsukawa et al. | 362/518 |
| 6,776,513 | B2 * | 8/2004 | Albou | 362/507 |
| 6,910,791 | B2 * | 6/2005 | Futami | 362/517 |
| 7,168,832 | B2 * | 1/2007 | Komatsu et al. | 362/507 |
| 7,341,367 | B2 * | 3/2008 | Tsukamoto et al. | 362/538 |
| 2003/0174509 | A1 * | 9/2003 | Futami | 362/517 |
| 2005/0190572 | A1 * | 9/2005 | Komatsu et al. | 362/538 |
| 2005/0225995 | A1 * | 10/2005 | Komatsu et al. | 362/512 |

FOREIGN PATENT DOCUMENTS

JP 2003-016813 A 1/2003

* cited by examiner

*Primary Examiner*—Jong-Suk(James) Lee
*Assistant Examiner*—Kevin Spinella
(74) *Attorney, Agent, or Firm*—Sughrue Mion, PLLC

(57) ABSTRACT

A lamp for a vehicle is provided with a projection lens, a light source, a reflector having a reflecting surface, which reflects a light from the light source toward the projection lens; a body of a vessel shape; a cover forming a lamp chamber together with the body; and an auxiliary lens. The auxiliary lens diffuses an incident light in a horizontal direction and is provided at least on one side of the projection lens in the vehicle width direction. A horizontal section of the cover is tilted in with respect to a phantom line that extends in a vehicle width direction, and the auxiliary lens is formed such that a thickness thereof becomes gradually thin in an outward direction from the projection lens, and that an outermost surface thereof in the horizontal section is parallel to the cover.

12 Claims, 7 Drawing Sheets

VEHICLE LAMP WITH AUXILIARY LENS

The present invention claims foreign priority to Japanese patent application no. 2005-209049, filed on Jul. 19, 2005, the content of which is incorporated herein by reference.

BACKGROUND OF THE INVENTION

1. Field of the Invention

The present invention relates to a lamp for a vehicle, the lamp having a projector-type lamp unit.

2. Description of the Background Art

In general, a vehicle lamp is configured in a manner that a lamp unit having an optical axis extending in the longitudinal direction of the vehicle is housed within a lamp chamber, which is formed by a lamp body and a translucent cover attached to the opening portion of the front end of the lamp body. An example of such a lamp unit is a projector-type lamp unit.

In a projector-type lamp of the related art, light emitted from a light source, which converges at a focal point and is diffused radially from the focal point, is projected in the irradiation direction by an aspheric lens, so that the shape of the light distribution pattern has a high degree of freedom, which is advantageous, while the illumination distribution within the light distribution pattern has a low degree of freedom. Thus, there is a problem, for example, that it is difficult to obtain a light distribution pattern that illuminates a distant place brightly. Further, the aspheric lens has a circular shape when seen from the front side thereof, and only the aspheric lens stands out when this lamp is attached to a vehicle. Thus, respective lamps have a similar appearance, so it is impossible to for the respective types of vehicles to have different designs.

In order to solve such problems, Japanese Patent Unexamined Publication JP-A-2003-16813 discloses a projector-type lamp shown in FIG. 7. The projector-type lamp 1 includes a reflecting mirror 2 that is divided into three parts consisting of central reflecting surfaces 2*a*, 2*b* formed so as to extend toward the side directions of a light source 3, upper reflecting surfaces 2*c*, 2*d* formed at the upper portions of the central reflecting surfaces 2*a*, 2*b*, respectively, and lower reflecting surfaces 2*e*, 2*f* formed at the lower portions of the central reflecting surfaces 2*a*, 2*b*, respectively. A projection lens 4 is formed by an aspherical lens 4*a*, which is disposed so as to have a focal point near the secondary focal point of the central reflecting surfaces 2*a*, 2*b*, and long sideways lenses 4*b*, 4*c*, which are disposed at the left and right sides of the aspherical lens 4*a*, respectively, so that the reflected light from the upper reflecting surfaces 2*c*, 2*d* and the reflected light from the lower reflecting surfaces 2*e*, 2*f* is incident on the long sideways lenses 4*b*, 4*c*, respectively.

Accordingly, illumination characteristics can be obtained so that the brightness in the near area is suppressed, while the distant area is illuminated brightly within the configuration of the light distribution characteristics and so the visibility of the headlamp for the light distribution at the time of running can be improved. Further, since the projection lens is configured by the aspherical lens and the long sideways lenses, the light emission area can be made large, thereby improving the visibility from oncoming vehicles. Furthermore, it becomes possible to have different designs for the different types of vehicles.

However, the projector-type lamp disclosed in JP-A-2003-16813 is configured so that each of the long sideways lenses disposed at the left and right sides of the aspherical lens is a cylindrical lens. Because this cylindrical lens merely diffuses light, it is difficult to control the incident light. In particular, the cylindrical lens can not illuminate direct a desired light distribution from the light source toward a side direction. Therefore, the visibility in the side direction of the road surface cannot be improved sufficiently. Further, since the cylindrical lens has a uniform thickness, the weight thereof is large. Accordingly, the cylindrical lens is disadvantageous in that it has a high cost and is difficult to form. Furthermore, since it is difficult to dispose the cylindrical lens along the tilt of a vehicle body, there is a limited number of different designs that can be used. For example, if the cylindrical lens is forceably fit along the tilt, the entire size of the lamp becomes large and the ability to use different designs is limited.

SUMMARY OF THE INVENTION

One aspect of the invention is a lamp for a vehicle including a projection lens; a light source; a reflector having a reflecting surface, which reflects a light from the light source toward the projection lens; a body of a vessel shape; a cover forming a lamp chamber together with the body; and an auxiliary lens. The auxiliary lens diffuses an incident light in a horizontal direction and is provided at least on one side of the projection lens in the vehicle width direction. A horizontal section of the cover is tilted with respect to a phantom line that extends in a vehicle width direction. The auxiliary lens is formed such that a thickness thereof becomes gradually thin in an outward direction from the projection lens, and that an outermost surface thereof in the horizontal section is parallel to the cover.

DESCRIPTION OF THE EXEMPLARY EMBODIMENT

Hereinafter, the exemplary embodiment of the vehicle lamp according to the invention will be explained with reference to drawings.

Figure 1:
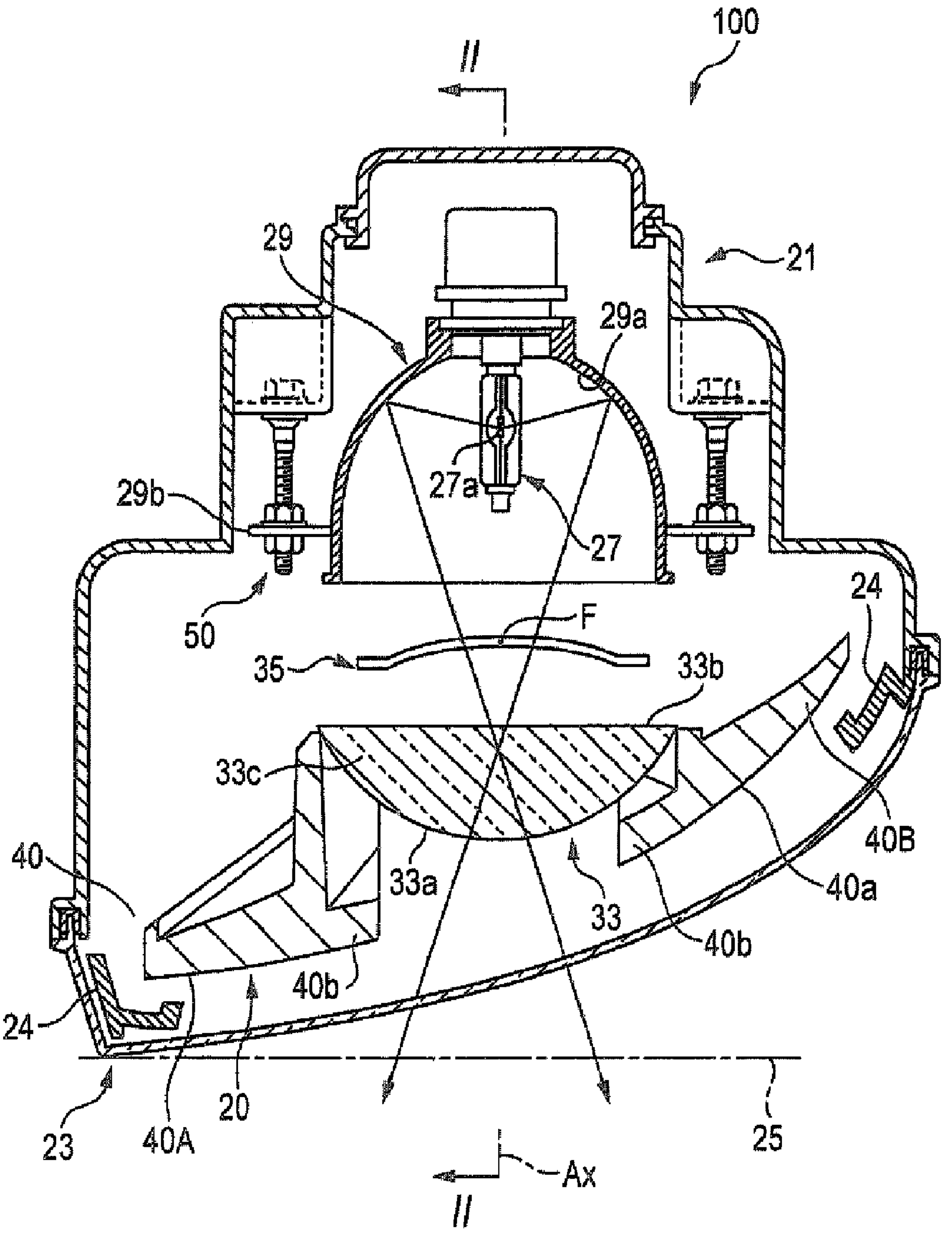
FIG. 1 is a plane sectional view of the vehicle lamp according to an exemplary embodiment of the invention.
Figure 2:
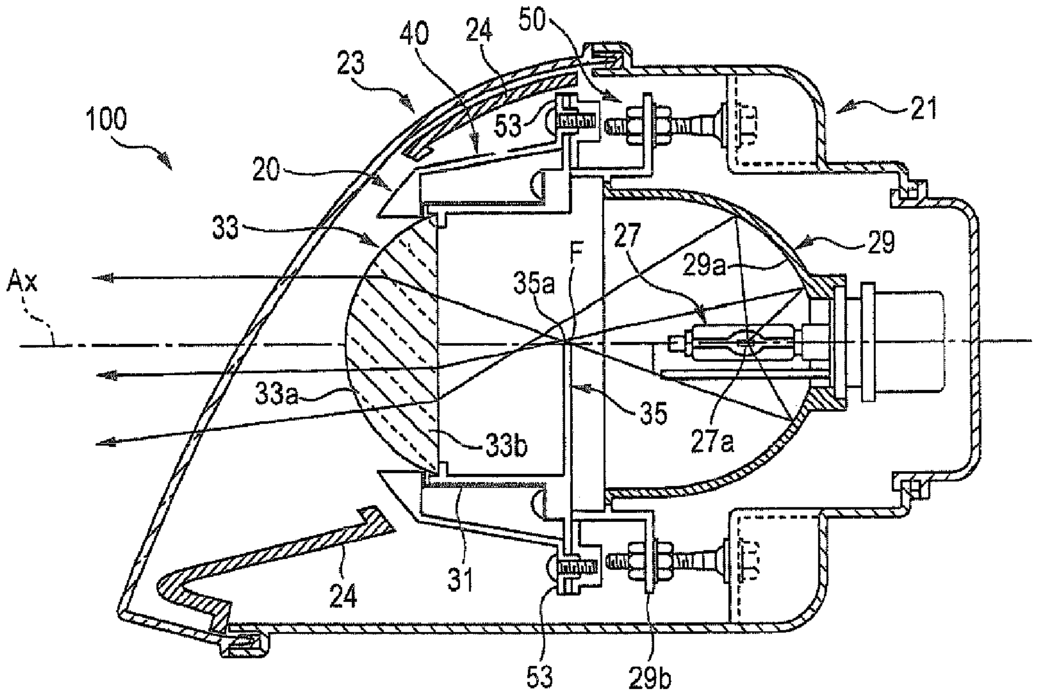
FIG. 2 is a sectional view cut along a line II-II in FIG. 1.

FIG. 1 is a plane sectional view of the vehicle lamp according to an exemplary embodiment of the invention, and FIG. 2 is a sectional view cut along a line II-II in FIG. 1.

As shown in these drawings, a vehicle lamp 100 is a lamp disposed at the left front end of a vehicle and is configured in a manner that a lamp unit 20 is housed within a lamp chamber which is formed by a lamp body 21 and a translucent cover 23 attached to the front end opening portion of the lamp body. In the vehicle lamp 100, a low-beam light distribution pattern is formed by illuminating the lamp unit 20. An extension 24 is disposed at the periphery of the front side of the lamp unit 20 so as to cover the front side end of the lamp unit 20.

The lamp unit 20 has an optical axis Ax extending in the longitudinal direction of the vehicle and is supported by the lamp body 21 via an aiming mechanism 50, which is able to incline the lamp body 21 in the left and right directions. When the aiming adjustment by the aiming mechanism 50 is completed, the optical axis Ax extends downward by about 0.5 to 0.6 degree with respect to the longitudinal direction of the vehicle.

The translucent cover 23 is configured so as to extend along the shape of the vehicle body of the left side corner of the front end of the vehicle. That is, as shown in FIG. 1, the translucent cover 23 extends backward toward the outside of the vehicle, in a vehicle width direction, and further, as shown in FIG. 2, the translucent cover 23 extends backward from the lower end edge thereof toward the upper end thereof. In other words, a horizontal section of the translucent cover 23 tilts with respect to a phantom line 25, which extends in the vehicle width direction. The tilting surface of the translucent cover 23 may be formed in a flat shape or may be formed in a curved shape, as shown in FIG. 1.

Next, the configuration of the lamp unit 20 will be explained.

The lamp unit 20 is a projector-type lamp unit and includes a light source bulb 27, a reflector 29, a lens holder 31, a projection lens 33, an auxiliary lens 40 and a shade 35.

The projection lens 33 is configured as a planer convex lens having a front side face 33*a* with a convex curved surface and a rear end face 33*b* (rear side face) with a planer surface and is disposed on the optical axis Ax. The projection lens 33 projects an inverted image forward from a surface having a rear side focal point F.

The convex curved surface constituting the front side face 33*a* of the projection lens 33 is configured by an aspherical surface that is formed with the rear side focal point F of the projection lens 33 on the optical axis Ax. That is, the aspherical surface shape of the convex curved surface constituting the front side face 33*a* is set as an enveloping surface configured by points, the points having a same optical length from the rear side focal point F set on the optical axis Ax to an optical axis orthogonal plane disposed in the forward direction of the projection lens 33. Thus, the front side face 33*a* of. the projection lens 33 outputs the light, which enters into the projection lens 33 via the reflector 29, almost parallel to the optical axis Ax.

The lens holder 31 is configured to have steps extending forward from the front end opening portion of the reflector 29 at the upper and lower portions sandwiching the projection lens 33. The lens holder 31 is fixedly supports the reflector 29 at the rear end portion of the lens holder 31 and fixedly supports the projection lens 33 at the front end portion of the lens holder 31.

The light source bulb 27 is a discharge bulb, such as a metal halide bulb having a discharge light emission portion as a light source 27*a*. The light source 27*a* is configured as a linear light source extending in the center axis direction of the bulb. The light source bulb 27 is inserted from the backside into and fixed to the rear end opening portion of the reflector 29 so that the light source 27*a* is disposed on the optical axis Ax behind the rear side focal point F of the projection lens 33.

The reflector 29 has a reflecting surface 29*a* for reflecting the light from the light source 27*a* in the forward direction toward the optical axis Ax. The reflecting surface 29*a* has a substantial focal point at the light source 27*a*. Further, the reflecting surface 29*a* has an almost elliptical shape, the eccentricity of the elliptical shape being set to be larger in the horizontal section than in the vertical section. Thus, the light from the light source 27*a* reflected by the reflecting surface 29*a* is almost converged near the rear side focal point F in the vertical section, and the converging position of the reflected light is shifted to a forward position in the horizontal section. The reflector 29 is supported by the lamp body 21 via the aiming mechanism 50 at aiming brackets 29*b* formed at four portions of the reflector.

The shade 35 is fixedly supported by the lens holder 31 so as to be positioned at almost the lower half portion of the inner space of the lens holder 31. The shade 35 is formed in a manner that the upper end edge 35*a* thereof passes through the rear side focal point F of the projection lens 33, whereby the shade is configured to shield a part of the reflected light from the reflecting surface 29*a* of the reflector 29 to remove the upward light outputted in the forward direction from the projection lens 33. This forms a light distribution pattern with a cut-off line.

Figure 3:
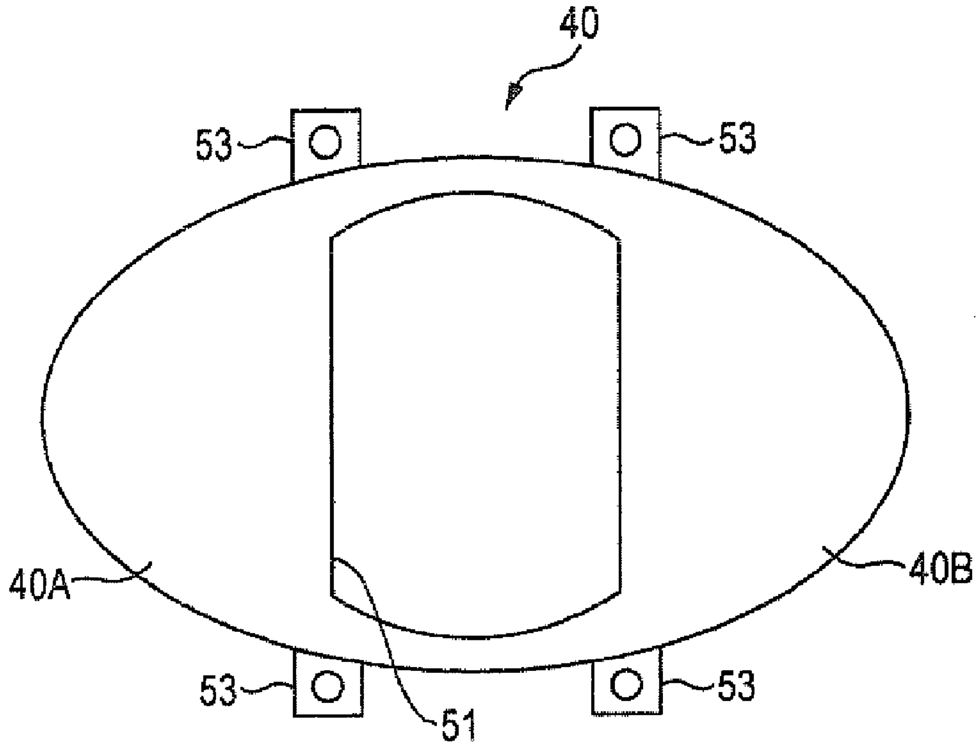
FIG. 3 is a front view of an auxiliary lens shown in FIG. 1.
Figure 4A:
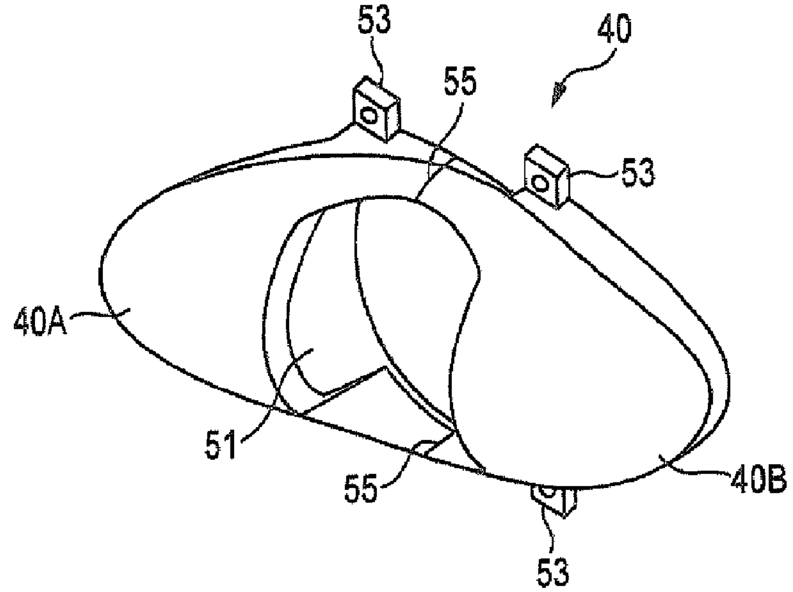
FIG. 4A is explanatory diagram illustrating a perspective front view of the auxiliary lens shown in FIG. 3.
Figure 4B:
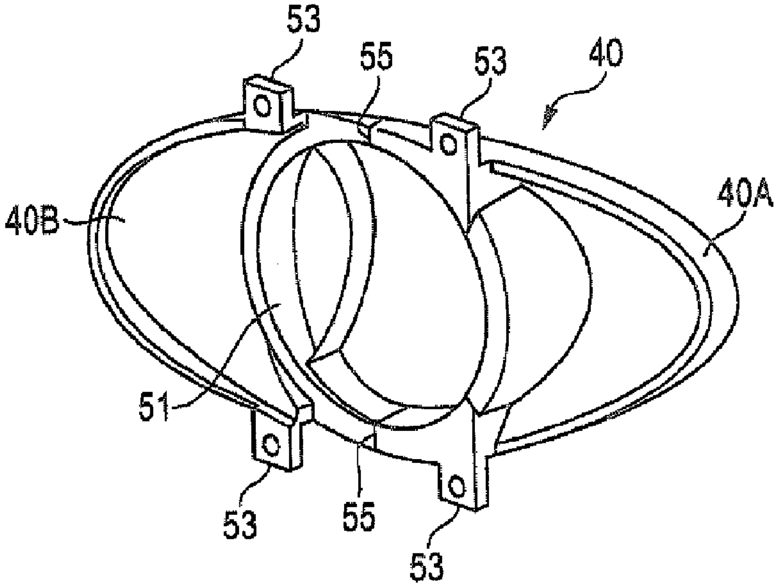
FIG. 4B is explanatory diagram illustrating a perspective rear view of the auxiliary lens shown in FIG. 3.

FIG. 3 is the front view of an auxiliary lens shown in FIG. 1, FIG. 4A is explanatory diagram illustrating a perspective front view of the auxiliary lens shown in FIG. 3, and FIG. 4B is explanatory diagram illustrating a perspective rear view of the auxiliary lens shown in FIG. 3.

As shown in FIG. 3, the auxiliary lens 40 has an almost elliptical shape when seen from the front side thereof and is provided with a housing hole 51 for housing the projection lens 33 at the center portion of the auxiliary lens 40. A pair of fixing pieces 53, 53 is protrusively provided at each of the upper and lower portions of the auxiliary lens 40. The fixing pieces 53, 53 are screwed and engaged with the lens holder 31 thereby to integrally hold the auxiliary lens 40 with the projection lens 33.

According to the embodiment, since the housing hole 51 for holding the projection lens 33 is provided at the center portion of the auxiliary lens 40, lens portions 40A, 40B are provided in the left and right directions of the projection lens 33, respectively. However, the auxiliary lens 40 may be arranged so that only one of the lens portions 40A, 40B in the left and right directions of the projection lens 33 is provided.

The auxiliary lens 40 is formed so that the thickness thereof becomes thinner gradually in accordance with the distance in the left and right directions away from the projection lens 33. Further, as shown in FIG. 1, the surface 40*a* of the auxiliary lens 40 is disposed so as to be almost parallel to the translucent cover 23 in the horizontal section. In this manner, since the auxiliary lens 40 has the thickness that becomes thinner gradually toward the left and right directions, the diffusion angle of the transmitted light can be changed in the direction away from the projection lens 33.

Further, in this embodiment, as shown in FIG. 1, an extension 24 is disposed on the front side of the end portions of the lens portions 40A, 40B of the auxiliary lens 40. In view of the assembly of the lamp, the extension 24 is preferably disposed on the front side of the auxiliary lens 40, that is, between the auxiliary lens 40 and the translucent cover 23. When not considering assembly but instead considering design of the lamp, the extension 24 may be disposed on the rear side of the auxiliary lens 40.

In this embodiment, the direct light from the light source bulb 27 becomes incident into the auxiliary lens 40. Basically, the auxiliary lens is configured by the curved surface of the lens which illuminates the direct light from the light source bulb 27 on the left and right road surfaces. In other words, the auxiliary lens has the optical property of diffusing the light from the light source bulb 27 in the horizontal direction and emitting the light downward with respect to the horizontal plane. As described later, the auxiliary lens 40 may be provided with a dedicated auxiliary optical system on the backward side of the auxiliary lens 40.

Further, as shown in FIG. 1, the auxiliary lens 40 is disposed so as to overlap with a portion (a peripheral portion 33*c*) of the projection lens 33; an amount of light passing through this portion is small. Thus, a part of the light emitted from the projection lens 33 is transmitted through the auxiliary lens 40 and then is emitted. Although, in this embodiment, the portion of the auxiliary lens overlapping with the projection lens 33 has no lens function, this overlapping portion 40*b* may be provided with a lens portion which controls the diffusion angle in the left and right directions of the transmitting light.

Although the surface 40*a* of the auxiliary lens 40 may be formed in a curved surface having a constant R (radius of 100), for example, the surface 40*a* may also be formed in other various kinds of curved surfaces and shapes. The auxiliary lens 40 covers the peripheral edge of the projection lens 33 thereby to enhance the sense of the integration with the projection lens 33. The auxiliary lens 40 is formed by a resin having good forming property. In this case, as shown in FIG. 4, the auxiliary lens 40 may be configured by two pieces which are formed by dividing the lens into left and right parts along a split line 55 at the almost center portion thereof thereby to secure good die-cutting property.

Figure 5:
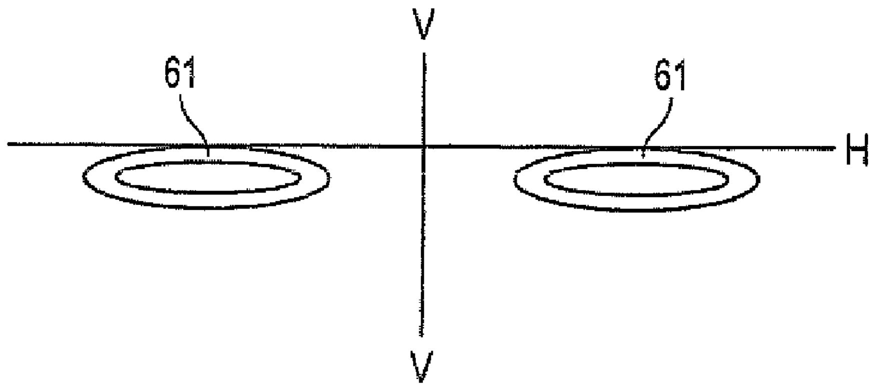
FIG. 5 is a diagram showing a light distribution pattern formed by the auxiliary lens.
Figure 6A:
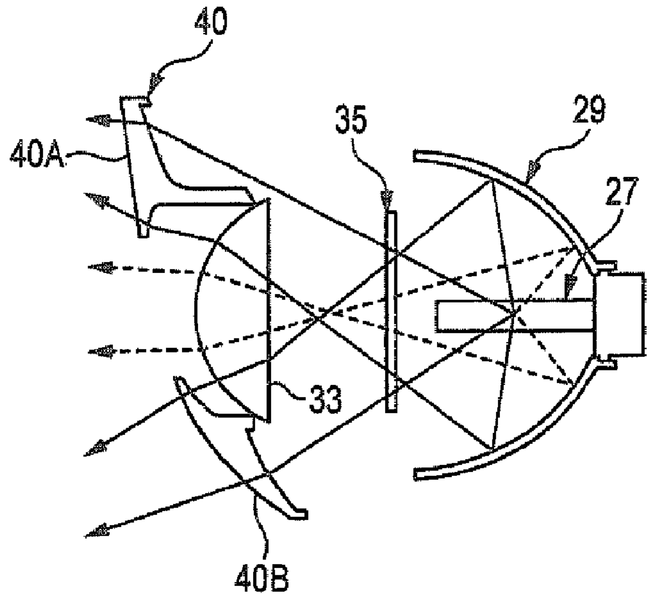
FIG. 6A is explanatory diagram illustrating an example of the auxiliary lens which emits a converging light.
Figure 6B:
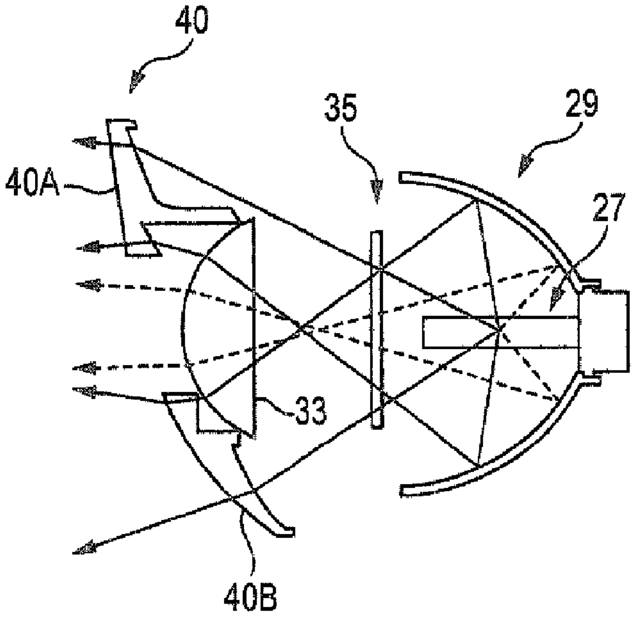
FIG. 6B is explanatory diagram illustrating an example of the auxiliary lens which emits a diffusion light.
Figure 7:
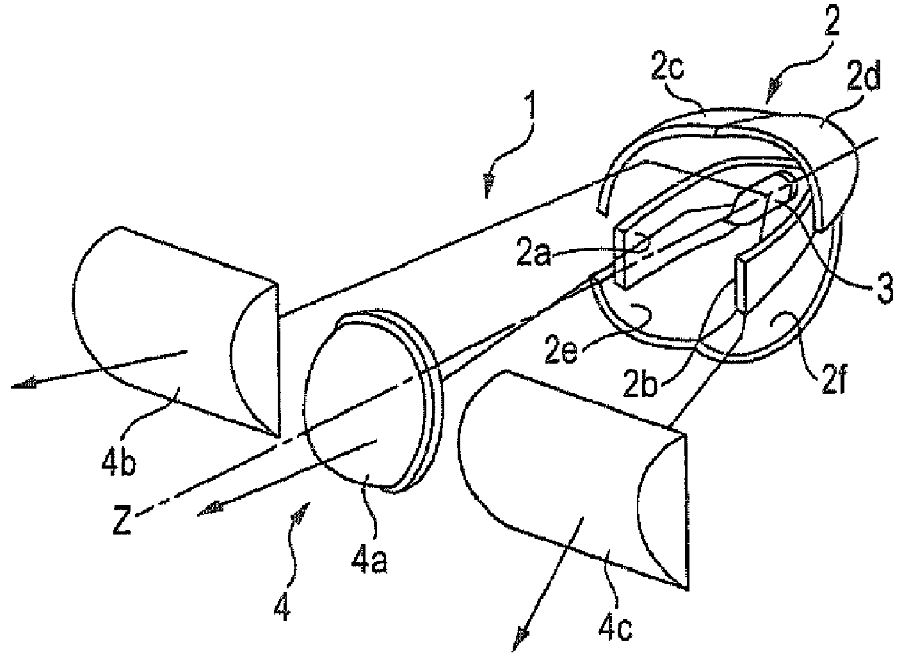
FIG. 7 is a schematic constitutional diagram showing a projector-type lamp of the related art.

FIG. 5 is a diagram which perspectively shows the light distribution pattern formed by the light emitted in the forward direction from the auxiliary lens 40 of the vehicle lamp 100 on the phantom vertical screen disposed at the position away from the lamp in the forward direction by 25 m. FIG. 6A is explanatory diagram illustrating an example of the auxiliary lens which emits a converging light, while FIG. 6B is explanatory diagram illustrating an example of the auxiliary lens which emits a diffusion light.

The light emitted from the auxiliary lens 40 forms high intensity regions 61, 61 just beneath and close to a line H-H so as to be symmetrical with respect to a line V-V. The auxiliary lens 40 is arranged in a manner that the diffusion angle in the left and right direction at the peripheral portion thereof is set to be larger than the diffusion angle in the left and right direction near the center portion thereof.

Further, as shown in FIG. 6A, the optical properties of the lens portions 40A, 40B of the auxiliary lens 40 may be set such that the direct light from the light source bulb 27 is emitted as a converging light which emits gradually away from the optical axis Ax as an emitting surface becomes closer to the optical axis Ax. Alternatively, as shown in FIG. 6B, the optical properties of the lens portions 40A, 40B of the auxiliary lens may be set such that the direct light from the light source bulb 27 is emitted as a diffusion light which emits gradually toward the optical axis Ax as an emitting surface becomes closer to the optical axis Ax.

Thus, according to the vehicle lamp 100, the translucent cover 23 constituting the lamp chamber together with the lamp body 21 tilts with respect to the phantom line 25 of the vehicle width direction; the auxiliary lens 40, which diffuses the incident light in the horizontal direction, is provided at least on one side of the projection lens 33 in the vehicle width direction; the auxiliary lens 40 is formed so that the thickness thereof becomes gradually thinner in an outward direction from the projection lens 33; and an outermost surface of the auxiliary lens 40 in a horizontal section is almost in parallel to the translucent cover 23. Thus, the projection lens 33 is surrounded by the auxiliary lens 40; and, therefore, the shape of the lamp is almost along the tilt of the translucent cover 23, whereby a unique design different from the aspherical lens of the round shape of the related art can be realized.

Further, the light passed through the projection lens 33 is converged in the vertical direction and projected in the forward direction as an almost parallel light, and the light transmitted through the auxiliary lens 40 can be distributed in the side direction. Therefore, the visibility in the side direction of the road surface can be improved simultaneously with the visibility in the forward direction. Furthermore, since the light emission area increases, the property of being seen can be improved and the visibility of walkers, etc. in the side direction of the road surface can be improved due to the light diffusion. Furthermore, since the effectively usable light fluxes increase due to the auxiliary lens 40, the visibility of the shoulder of a road is also improved. Furthermore, since the auxiliary lens 40 extends in the side directions of the projection lens 33, the diffusion light is hardly shielded by the extension and the holder within the lamp, so that the utilization efficiency of the light from the light source bulb 27 can be improved. Furthermore, since the thickness of the auxiliary lens 40 becomes thinner gradually toward the side directions, the diffusion angle of the diffusion light can be controlled.

Furthermore, since the auxiliary lens 40 is disposed almost in parallel to the translucent cover 23, the translucent cover 23 can be disposed close to almost over the entire surface of the auxiliary lens 40. Thus, the lamp unit 20 can be miniaturized, and also the vehicle lamp 100 can be entirely miniaturized.

In this respect, if the auxiliary lens 40 is disposed so as not to be in parallel to the translucent cover 23 and is disposed away from the translucent cover, a part of the light that is diffused by the auxiliary lens 40 and directed in the side direction is shielded by an obstacle such as the extension 24 or the outer wall of the body and an amount of light being illuminated may be reduced. However, in this embodiment, since the auxiliary lens 40 is disposed almost in parallel to and close to the translucent cover 23 almost over the entire surface thereof, the light emitted from the auxiliary lens 40 cannot be shielded by an obstacle; and, therefore, the light can be illuminated in the forward and side directions.

Further, since the auxiliary lens 40 can change the diffusion angle of the transmitted light in the directions away from the projection lens 33, it becomes possible to increase an amount of the light being illuminated on the desired position in the side of the road surface by narrowing the diffusion angle or to emit the light in the wide range.

Further, since the direct light from the light source bulb 27 is entered into the auxiliary lens 40, the direct light from the light source bulb 27 can be illuminated on the road surface while also being diffused, whereby the visibility as to walkers, etc. in the side direction of the road surface can be improved.

In addition, according to the vehicle lamp 100 of this embodiment, since the inner portion of the lamp chamber can be covered by the auxiliary lens 40, the extension can be eliminated. Further, when the auxiliary lens 40 is tilted so as to follow along the shape of the vehicle body, the property of being seen from the side direction of the road surface can be improved. Further, when the lens with a large thickness is used, it is possible to provide a translucent and posh image. Furthermore, due to the light emission from the auxiliary lens 40 portion, the light emitting area increases and the area of the non-light emitting portion of the lamp portion can be reduced, whereby the property of being seen can be enhanced and also the safety can be improved in the night.

Although, in the aforesaid exemplary embodiment, the explanation is made as to a case where the direct light from the light source bulb 27 is entered into the auxiliary lens 40, the vehicle lamp according to the invention may be configured in a manner that another dedicated light source serving as an auxiliary optical system is provided in the rear side of the auxiliary lens 40 so as to enter the light from this other light source into the auxiliary lens. Alternatively, the vehicle lamp according to the invention maybe configured so that a dedicated reflector serving as an auxiliary optical system is provided in the rear direction of the auxiliary lens 40 so that the light from the light source bulb 27 is reflected by the dedicated reflector, and then the reflected light is entered into the auxiliary lens 40.

According to such a configuration, an amount of light illuminated in the side direction of the road surface can be increased, and so the visibility can be further improved. Further, when the dedicated reflector is additionally provided, the light to be absorbed into the inner wall of the lamp chamber can be entered into the auxiliary lens 40, so that the utilization efficiency of the light from the light source bulb 27 can be improved.

In this case, the dedicated reflector provided in the rear direction of the auxiliary lens 40 may be formed by subjecting the inner wall surface of the lamp body 21 to the grain finish, painting, anodizing, metal plating or deposition etc. In this case, the dark portion within the lamp chamber can be made small, thereby improving the design.

Further, although, in the aforesaid embodiment, the explanation is made for a vehicle lamp 100 that is disposed at the left front end portion of a vehicle, the vehicle lamp may be disposed at the right front end portion of a vehicle. In this case, function and effects similar to those of the aforesaid embodiment can be obtained by employing the configuration similar to those of the aforesaid embodiment.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A lamp for a vehicle comprising:

a projection lens;

a light source;

a reflector having a reflecting surface which reflects a light from the light source toward the projection lens;

a body of a vessel shape;

a cover forming a lamp chamber together with the body; and an auxiliary lens, which diffuses an incident light from the light source in a horizontal direction and is provided at least on one side of the projection lens in a vehicle width direction, wherein a horizontal section of the cover is tilted with respect to a phantom line that extends in the vehicle width direction, and the auxiliary lens is formed such that a thickness of the auxiliary lens becomes gradually thinner in an outward direction from the projection lens, and an outermost surface of the auxiliary lens in the horizontal section is parallel to the cover;

wherein the auxiliary lens comprises an overlapping portion which overlaps the projection lens, is positioned in front of the projection lens, and is separate with respect to the projection lens.

2. The lamp for a vehicle according to claim 1, wherein the auxiliary lens is formed such that a diffusion angle of a light transmitting therethrough changes in accordance with the distance away from the projection lens.

3. The lamp for a vehicle according to claim 1, wherein a direct light from the light source is entered into the auxiliary lens.

4. The lamp for a vehicle according to claim 3, wherein the auxiliary lens is adjacent to the projection lens.

5. The lamp for a vehicle according to claim 1, further comprising an auxiliary optical system provided in a rear side of the auxiliary lens.

6. The lamp for a vehicle according to claim 5, wherein the auxiliary optical system comprises a reflector formed on an inner surface of the body.

7. The lamp for a vehicle according to claim 1, further comprising an extension between the auxiliary lens and the cover.

8. The lamp for a vehicle according to claim 1, further comprising an extension on the rear side of the auxiliary lens.

9. The lamp for a vehicle according to claim 1, wherein the overlapping portion of the auxiliary lens is provided with a lens portion which controls a diffusion angle of a light transmitting therethrough.

10. The lamp for a vehicle according to claim 1, wherein the auxiliary lens is formed by a resin in a two piece structure.

11. The lamp for a vehicle according to claim 1, wherein the auxiliary lens is adjacent to the projection lens.

12. The lamp for a vehicle according to claim 1, wherein the overlapping portion deflects light that has been transmitted through the projection lens.

* * * * *